(No Model.)
H. F. KIRKPATRICK-PICARD & H. THAME.
PROCESS OF MANUFACTURING PLATES FOR SECONDARY BATTERIES.
No. 530,847. Patented Dec. 11, 1894.
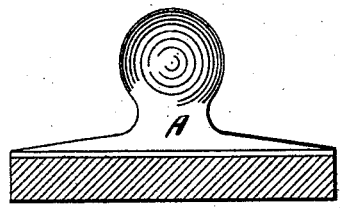
FIG. 1.
FIG. 2.
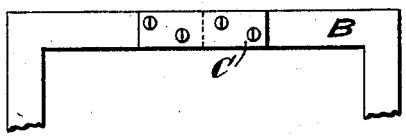
FIG. 3.
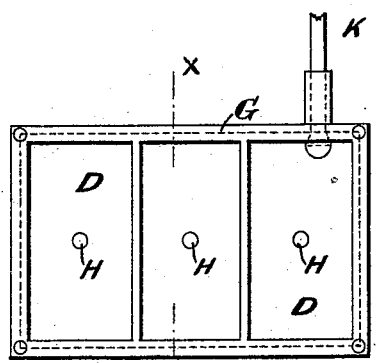
FIG. 4.
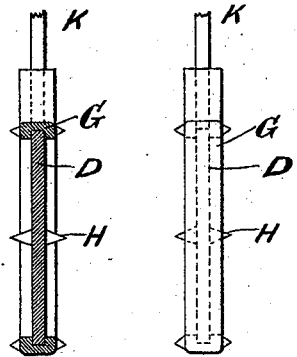
FIG. 5. FIG. 6.
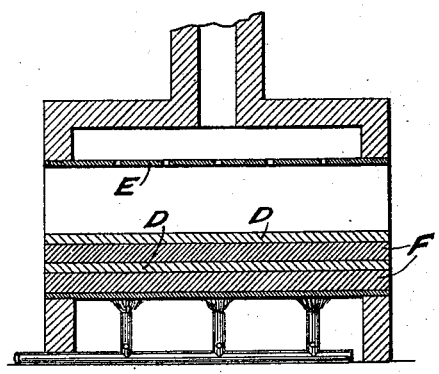
FIG. 7.
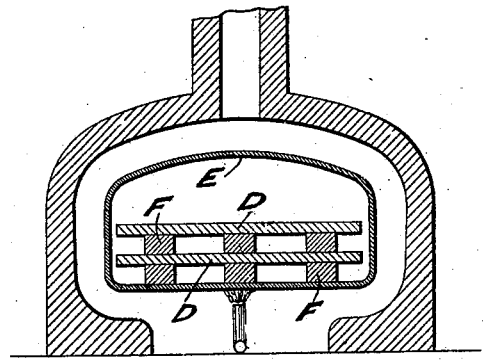
FIG. 8.
Witnesses:
E. H. Sturtevant
H. van Oldenneel
Inventors:
Hugh Fitzalis Kirkpatrick Picard
Henry Thame
by
their attorneys

UNITED STATES PATENT OFFICE.

HUGH FITZALIS KIRKPATRICK-PICARD AND HENRY THAME, OF LONDON, ENGLAND.

PROCESS OF MANUFACTURING PLATES FOR SECONDARY BATTERIES.

SPECIFICATION forming part of Letters Patent No. 530,847, dated December 11, 1894.

Application filed January 13, 1894. Serial No. 496,802. (No specimens.) Patented in England June 8, 1892, No. 10,855.

*To all whom it may concern:*

Be it known that we, HUGH FITZALIS KIRKPATRICK-PICARD and HENRY THAME, residing at London, England, have invented an Improvement in Processes for Manufacturing Plates for Secondary Batteries, (which has been patented to us in Great Britain under No. 10,855, dated June 8, 1892,) of which the following is a specification.

This invention relates to the process of manufacturing porous metallic lead plates for secondary electrical batteries and to supports for the same.

The object of this invention is to get a plate or element which shall as near as possible be in the form of true spongy lead before the application of any electric current to the said plate or elements.

Our invention consists in the specific process of manufacture of the said plates hereinafter described.

The process of manufacture is based upon the fact that an oxide of lead, such as red lead ($Pb_3O_4$) can be reduced to metallic lead by an admixture of a reducing agent therewith, such as sulphide of lead (PbS), with the simultaneous formation of a gas, which in the above example would be sulphur dioxide.

The method of manufacture may be as follows:—Red lead is mixed mechanically with sulphide of lead, either artificially fused and pulverized or precipitated or the natural mineral, "galena," may be employed. We find that about three parts of PbS, to one part of said oxide, are about the proper proportions in practice, as the atmospheric oxidation produced must be allowed for; which would not be the case, if the quantities demanded by theory were employed. An amount of the said mixture sufficient to make one plate or element is dampened with water, stale beer, or any suitable damping agent, but preferably treacle, to form a plastic mass, and molded by pressure in a mold or suitable contrivance which may be rectangular, beveled, dovetailed, slotted or any other shape as may be required. Any suitable means of obtaining pressure may be employed. The molded plate or element is then transferred to a suitable fire-proof bed, as brick, cast iron or other convenient material. The elements are then allowed to dry for a convenient time. When dry, they are fired in a suitable furnace which may be a muffle, a wind furnace, or any convenient apparatus for applying heat to the said elements. We prefer to fire on thin strips of carbon so disposed as to allow circulation of air over and under the plate. The plates may be fired in stacks, each being separated from the other by strips of carbon rod, disposed according to size of plate, &c.

In order that our invention may be the better understood, we herewith illustrate and describe convenient means employed by us to effect and the finished plate produced by our improved process.

Figure 1— is a press-head. Figs. 2 and 3— are a transverse section and part plan of a mold for forming the plate or element by pressure. Figs. 4, 5 and 6 are an outside elevation, a transverse section on line X Y, and an end view respectively of our finished plate. Figs. 7 and 8— are a longitudinal and transverse section of a suitable gas-heated furnace for oxidizing said plates.

A is a press head operated by hand by the blows of a mallet, or by any source of pressure, by which we compress the plastic material of our element into the required form as a plate in a containing mold or frame B over a smooth surface table, the frame being adapted to be taken apart by screwed plates c after the plate is formed.

The plates D when formed in above mold are placed in a muffle furnace or oven E, in layers, separated by distance pieces of carbon F, so that air may circulate over and under the plate. When the oxidation is complete, the plate D is provided with a frame G and separators H of india rubber, the former of which is worked in a plastic and semi-vulcanized condition, over the edge of the plate in one piece, so as firmly to embrace it, and protect it against eventual fracture under handling. The separators are attached in place, and the frame and separators are then vulcanized in position on the plate. The resultant plate, so protected, may be thrown about without fracture of, or damage to the plate.

The heat to be applied is to be such that the chemical reaction between the sulphide of lead or other reducing material with the oxide of lead shall take place, but the heat should not be sufficient to cause the complete fusion of the subsequent element; otherwise a litharge plate would be produced by reason of the ready oxidation of the metallic lead by the atmosphere at a high temperature. We find a temperature of from 500° to 600° centigrade gives good results, and that at this temperature the body of the plate does not melt or completely fuse owing to its peculiar spongy or molecular condition.

The element may be annealed both during the putting in and the removal from the furnace if thought desirable.

After a convenient time according to the heat of the furnace, which time may vary from five minutes to half-an-hour, or beyond these limits if necessary, the plates or elements are withdrawn from the furnace; however the time must not be so long as to allow atmospheric oxidation to penetrate throughout the plate and cause the spongy plate produced to re-oxidize to litharge. The resultant element consists of a central layer of spongy lead with the edges, top and bottom somewhat oxidized to litharge. The element is porous to a high degree owing to the evolution of sulphur dioxide during the reaction.

Should any fractures occur in the element at any time they may be repaired by fusing in oxide of lead or lead under a suitable source of heat. To form a pole piece thereon we cut out a rectangular piece of the plate about one inch from the edge and having inserted the end of a pole piece K, which should fit the space left by the cutting away, we burn the pole piece to the body of the plate. We do not put any metal frame round, but a vulcanite one direct onto the plate, as above described. The plates are then ready to be placed into cells or the usual receptacles, containing acid and water, with sulphate of soda or any of the commonly employed media, and are then ready to be charged electrically by any of the well known methods.

Having now described our invention, what we claim, and desire to secure by Letters Patent, is—

1. A process for the manufacture of plates for secondary electrical batteries consisting of the firing of plates mechanically admixed of about three parts of lead sulphide and one part of lead oxide, in a closed furnace or oven at about 500° to 600° centigrade, air being admitted through the said furnace or oven, and about the surface of the said plates, to effect the chemical re-action of the said oxide and sulphide of lead, and to produce in a short time, a plate with central layer of spongy lead and surfaces oxidized to litharge, ready for immediate and effective use in a secondary battery, substantially as described.

2. A process for the manufacture of framed plates for secondary electrical batteries consisting of the firing of plates, mechanically admixed of oxide and sulphide of lead, the adaptation thereto when hard and cold, of semi-vulcanized india-rubber, in a plastic condition, to embrace in a solid mass without joint, the edges of the said plate; the adaptation, similarly, of separate pieces to the surface of the said plates; and finally, a vulcanization of the said frame and separators *in situ* on the plate by heat, substantially as described.

In testimony whereof we have signed our names to this specification in the presence of two subscribing witnesses.

HUGH FITZALIS KIRKPATRICK-PICARD.
HENRY THAME.

Witnesses:
RICHARD A. HOFFMANN,
CHARLES H. CARTER.